US010400931B2

(12) United States Patent
Souma et al.

(10) Patent No.: US 10,400,931 B2
(45) Date of Patent: Sep. 3, 2019

(54) BENT PIPE STRUCTURE

(71) Applicant: NIFCO INC., Yokosuka-shi (Kanagawa) (JP)

(72) Inventors: Youhei Souma, Yokosuka (JP); Hiroyuki Nakaya, Yokosuka (JP); Yoshio Tomono, Yokosuka (JP); Tadahiro Kitamura, Yokosuka (JP); Yoshiyuki Goto, Yokosuka (JP)

(73) Assignee: Nifco Inc., Kanagawa (JP)

( * ) Notice: Subject to any disclaimer, the term of this patent is extended or adjusted under 35 U.S.C. 154(b) by 367 days.

(21) Appl. No.: 15/126,774

(22) PCT Filed: Feb. 26, 2015

(86) PCT No.: PCT/JP2015/055673
§ 371 (c)(1),
(2) Date: Sep. 16, 2016

(87) PCT Pub. No.: WO2015/141435
PCT Pub. Date: Sep. 24, 2015

(65) Prior Publication Data

US 2018/0128408 A1 May 10, 2018

(30) Foreign Application Priority Data

Mar. 18, 2014 (JP) ................................ 2014-055591

(51) Int. Cl.
*F16L 43/00* (2006.01)
*B29C 45/44* (2006.01)
*B29L 31/24* (2006.01)

(52) U.S. Cl.
CPC ........ *F16L 43/008* (2013.01); *B29C 45/4421* (2013.01); *B29L 2031/243* (2013.01)

(58) Field of Classification Search
CPC .... F16L 43/00; F16L 43/008; B29L 2031/243
(Continued)

(56) References Cited

U.S. PATENT DOCUMENTS 2,303,949 A * 12/1942 Nordell ................ F16L 43/001 138/39
5,054,819 A * 10/1991 Grunwald ............ F16L 43/001 285/133.11
(Continued)

FOREIGN PATENT DOCUMENTS

CH 675761 A5 * 10/1990 ............. F16L 59/22
JP 4-56200 9/1992
(Continued)

OTHER PUBLICATIONS

Written Opinion of the ISA of PCT/JP2015/055673 date of completion May 8, 2015.

*Primary Examiner* — Aaron M Dunwoody
(74) *Attorney, Agent, or Firm* — Thomas|Horstemeyer, LLP

(57) ABSTRACT

A curved portion at an inner circumferential face on a bend direction inside of a bend has a circular arc shape. By configuring the curved portion with a circular arc shape, a recess, serving as an example of a cross-sectional area enlargement portion that enlarges the cross-sectional area of a flow path of a pipe body running along a direction of an axial line 13, is formed in the inner circumferential face on the bend direction inside of the bend.

20 Claims, 26 Drawing Sheets

(58) Field of Classification Search
USPC .......................................................... 285/179
See application file for complete search history.

(56) References Cited

U.S. PATENT DOCUMENTS

| | | | | |
|---|---|---|---|---|
| 5,230,369 | A * | 7/1993 | Presz, Jr. | F15D 1/04 138/37 |
| 6,422,608 | B1 * | 7/2002 | Lee | B65G 53/523 285/131.1 |
| 2005/0140060 | A1 | 6/2005 | Evans et al. | |
| 2013/0099477 | A1 * | 4/2013 | Horiguchi | B23C 3/16 285/179 |
| 2015/0226360 | A1 * | 8/2015 | Souma | B29C 45/2614 285/179 |
| 2016/0131019 | A1 * | 5/2016 | Sakai | F01P 7/14 138/118 |

FOREIGN PATENT DOCUMENTS

| | | |
|---|---|---|
| JP | 4-362394 | 12/1992 |
| JP | 2001219453 | 8/2001 |
| JP | 2003-254490 | 9/2003 |
| JP | 2012-516413 | 7/2012 |
| WO | 2008119628 | 10/2008 |

* cited by examiner

FIG.10A

Present Exemplary Embodiment (Inner Diameter 6 mm)

| | | | Curvature R (mm) | | |
|---|---|---|---|---|---|
| | | | 1 | 2 | 3 |
| Width H (mm) | 1 | in (Pa) | 771934 | | |
| | | out (Pa) | 106970 | | |
| | | Pressure drop (kPa) | 665.0 | | |
| | | ▲Pressure drop (%) | 12.4 | | |
| | 2 | in (Pa) | 809308 | | |
| | | out (Pa) | 100894 | | |
| | | Pressure drop (kPa) | 708.4 | | |
| | | ▲Pressure drop (%) | 6.7 | | |
| | 3 | in (Pa) | 736009 | 663833 | |
| | | out (Pa) | 109957 | 122724 | |
| | | Pressure drop (kPa) | 626.1 | 541.1 | |
| | | ▲Pressure drop (%) | 17.6 | 28.7 | |
| | 4 | in (Pa) | 676202 | | |
| | | out (Pa) | 94339 | | |
| | | Pressure drop (kPa) | 581.9 | | |
| | | ▲Pressure drop (%) | 23.4 | | |

FIG.10B

Comparative Example (Inner Diameter 6 mm)

| | | | R (mm) |
|---|---|---|---|
| | | | 0 |
| | 0 | in (Pa) | 883545 |
| | | out (Pa) | 124148 |
| | | Pressure drop (kPa) | 759.4 |

FIG.11A

Present Exemplary Embodiment (Inner Diameter 6 mm)

| | | | R (mm) | | | | |
|---|---|---|---|---|---|---|---|
| | | | 3 | 5 | 7 | 9 | 11 |
| Width H (mm) | 5 | in (Pa) | 11042 | 10474 | | | |
| | | out (Pa) | 1637 | 1947 | | | |
| | | Pressure drop (kPa) | 9.41 | 8.53 | | | |
| | | ▲Pressure drop (%) | 7.2 | 15.9 | | | |
| | 7 | in (Pa) | 10803 | 9684 | | | |
| | | out (Pa) | 1979 | 1986 | | | |
| | | Pressure drop (kPa) | 8.82 | 7.70 | | | |
| | | ▲Pressure drop (%) | 13.0 | 24.1 | | | |
| | 9 | in (Pa) | 10154 | 8993 | 8392 | | |
| | | out (Pa) | 1939 | 1971 | 2175 | | |
| | | Pressure drop (kPa) | 8.215 | 7.022 | 6.217 | | |
| | | ▲Pressure drop (%) | 19.0 | 30.7 | 38.7 | | |
| | 11 | in (Pa) | 9563 | 8453 | 7629 | | |
| | | out (Pa) | 1810 | 1949 | 2042 | | |
| | | Pressure drop (kPa) | 7.753 | 6.504 | 5.587 | | |
| | | ▲Pressure drop (%) | 23.5 | 35.8 | 44.9 | | |
| | 13 | in (Pa) | 9438 | 7900 | | | |
| | | out (Pa) | 1899 | 2016 | | | |
| | | Pressure drop (kPa) | 7.539 | 5.884 | | | |
| | | ▲Pressure drop (%) | 25.6 | 42.0 | | | |
| | 15 | in (Pa) | 9289 | | | | |
| | | out (Pa) | 1911 | | | | |
| | | Pressure drop (kPa) | 7.378 | | | | |
| | | ▲Pressure drop (%) | 27.2 | | | | |

FIG.11B

Comparative Example (Inner Diameter 16 mm)

| | | | R (mm) |
|---|---|---|---|
| | | | 0 |
| | 0 | in (Pa) | 11884 |
| | | out (Pa) | 1746 |
| | | Pressure drop (kPa) | 10.14 |

FIG.12A

Present Exemplary Embodiment (Inner Diameter 23 mm)

| | | | Curvature R (mm) | | | |
|---|---|---|---|---|---|---|
| | | | 7 | 10 | 13 | 16 |
| Width H (mm) | 6 | in (Pa) | | | | |
| | | out (Pa) | | | | |
| | | Pressure drop (kPa) | | | | |
| | | ▲Pressure drop (%) | | | | |
| | 8 | in (Pa) | 2038 | | | |
| | | out (Pa) | 357 | | | |
| | | Pressure drop (kPa) | 1.681 | | | |
| | | ▲Pressure drop (%) | 23.9 | | | |
| | 10 | in (Pa) | 1923 | | | |
| | | out (Pa) | 348 | | | |
| | | Pressure drop (kPa) | 1.575 | | | |
| | | ▲Pressure drop (%) | 28.7 | | | |
| | 12 | in (Pa) | 1800 | | | |
| | | out (Pa) | 348 | | | |
| | | Pressure drop (kPa) | 1.452 | | | |
| | | ▲Pressure drop (%) | 34.3 | | | |
| | 14 | in (Pa) | 1650 | | | |
| | | out (Pa) | 325 | | | |
| | | Pressure drop (kPa) | 1.325 | | | |
| | | ▲Pressure drop (%) | 40.0 | | | |
| | 16 | in (Pa) | 1696 | 1465 | | |
| | | out (Pa) | 406 | 374 | | |
| | | Pressure drop (kPa) | 1.29 | 1.091 | | |
| | | ▲Pressure drop (%) | 41.8 | 50.6 | | |
| | 18 | in (Pa) | 1530 | | | |
| | | out (Pa) | 360 | | | |
| | | Pressure drop (kPa) | 1.17 | | | |
| | | ▲Pressure drop (%) | 47.1 | | | |
| | 20 | in (Pa) | 1517 | | | |
| | | out (Pa) | 366 | | | |
| | | Pressure drop (kPa) | 1.151 | | | |
| | | ▲Pressure drop (%) | 47.9 | | | |

FIG.12B

Comparative Example (Inner Diameter 23 mm)

| | | | R (mm) |
|---|---|---|---|
| | | | 0 |
| | 0 | in (Pa) | 2631 |
| | | out (Pa) | 410 |
| | | Pressure drop (kPa) | 2.21 |

-- PRIOR ART --

-- PRIOR ART --

-- PRIOR ART --

FIG.19A

Present Exemplary Embodiment (Inner Diameter 6 mm)

| | | | Curvature R (mm) | | |
|---|---|---|---|---|---|
| | | | 1 | 2 | 3 |
| Width H (mm) | 1 | in (Pa) | | 778742 | 746152 |
| | | out (Pa) | | 99882 | 107425 |
| | | Pressure drop (kPa) | | 678.9 | 638.7 |
| | | ▲Pressure drop (%) | | 10.6 | 15.9 |
| | 2 | in (Pa) | | 773297 | |
| | | out (Pa) | | 111989 | |
| | | Pressure drop (kPa) | | 661.3 | |
| | | ▲Pressure drop (%) | | 12.9 | |
| | 3 | in (Pa) | | | |
| | | out (Pa) | | | |
| | | Pressure drop (kPa) | | | |
| | | ▲Pressure drop (%) | | | |
| | 4 | in (Pa) | | | |
| | | out (Pa) | | | |
| | | Pressure drop (kPa) | | | |
| | | ▲Pressure drop (%) | | | |

FIG.19B

Comparative Example (Inner Diameter 6 mm)

| | | | R (mm) |
|---|---|---|---|
| | | | 0 |
| | 0 | in (Pa) | 883545 |
| | | out (Pa) | 124148 |
| | | Pressure drop (kPa) | 759.4 |

FIG.20A

Present Exemplary Embodiment (Inner Diameter 18 mm)

| | | | Curvature R (mm) | | | | |
|---|---|---|---|---|---|---|---|
| | | | 3 | 5 | 7 | 9 | 11 |
| Width H (mm) | 5 | in (Pa) | | | 9607 | 9962 | 9034 |
| | | out (Pa) | | | 2191 | 2375 | 2505 |
| | | Pressure drop (kPa) | | | 7.42 | 7.59 | 6.53 |
| | | ▲Pressure drop (%) | | | 26.8 | 25.2 | 35.6 |
| | 7 | in (Pa) | | | 8750 | 8459 | |
| | | out (Pa) | | | 2304 | 2115 | |
| | | Pressure drop (kPa) | | | 6.45 | 6.34 | |
| | | ▲Pressure drop (%) | | | 36.4 | 37.4 | |
| | 9 | in (Pa) | | | | | |
| | | out (Pa) | | | | | |
| | | Pressure drop (kPa) | | | | | |
| | | ▲Pressure drop (%) | | | | | |
| | 11 | in (Pa) | | | | | |
| | | out (Pa) | | | | | |
| | | Pressure drop (kPa) | | | | | |
| | | ▲Pressure drop (%) | | | | | |
| | 13 | in (Pa) | | | | | |
| | | out (Pa) | | | | | |
| | | Pressure drop (kPa) | | | | | |
| | | ▲Pressure drop (%) | | | | | |
| | 15 | in (Pa) | | | | | |
| | | out (Pa) | | | | | |
| | | Pressure drop (kPa) | | | | | |
| | | ▲Pressure drop (%) | | | | | |

FIG.20B

Comparative Example (Inner Diameter 18 mm)

| | | | R (mm) |
|---|---|---|---|
| | | | 0 |
| | 0 | in (Pa) | 11884 |
| | | out (Pa) | 1746 |
| | | Pressure drop (kPa) | 10.14 |

FIG.21A

Present Exemplary Embodiment (Inner Diameter 23 mm)

| | | | Curvature R (mm) | | | |
|---|---|---|---|---|---|---|
| | | | 7 | 10 | 13 | 16 |
| Width H (mm) | 6 | in (Pa) | 2134 | 2039 | 1981 | 1940 |
| | | out (Pa) | 364 | 425 | 480 | 365 |
| | | Pressure drop (kPa) | 1.77 | 1.614 | 1.501 | 1.575 |
| | | ▲Pressure drop (%) | 19.9 | 27.0 | 32.1 | 28.7 |
| | 8 | in (Pa) | | 1854 | 1794 | |
| | | out (Pa) | | 437 | 502 | |
| | | Pressure drop (kPa) | | 1.417 | 1.292 | |
| | | ▲Pressure drop (%) | | 35.9 | 41.5 | |
| | 10 | in (Pa) | | 1718 | 1656 | |
| | | out (Pa) | | 450 | 512 | |
| | | Pressure drop (kPa) | | 1.268 | 1.144 | |
| | | ▲Pressure drop (%) | | 42.6 | 48.2 | |
| | 12 | in (Pa) | | 1598 | 1538 | |
| | | out (Pa) | | 445 | 494 | |
| | | Pressure drop (kPa) | | 1.153 | 1.044 | |
| | | ▲Pressure drop (%) | | 47.8 | 52.8 | |
| | 14 | in (Pa) | | 1545 | | |
| | | out (Pa) | | 404 | | |
| | | Pressure drop (kPa) | | 1.141 | | |
| | | ▲Pressure drop (%) | | 48.4 | | |
| | 16 | in (Pa) | | | | |
| | | out (Pa) | | | | |
| | | Pressure drop (kPa) | | | | |
| | | ▲Pressure drop (%) | | | | |
| | 18 | in (Pa) | | | | |
| | | out (Pa) | | | | |
| | | Pressure drop (kPa) | | | | |
| | | ▲Pressure drop (%) | | | | |
| | 20 | in (Pa) | | | | |
| | | out (Pa) | | | | |
| | | Pressure drop (kPa) | | | | |
| | | ▲Pressure drop (%) | | | | |

FIG.21B

Comparative Example (Inner Diameter 23 mm)

| | | | R (mm) |
|---|---|---|---|
| | | | 0 |
| | 0 | in (Pa) | 2631 |
| | | out (Pa) | 410 |
| | | Pressure drop (kPa) | 2.21 |

BENT PIPE STRUCTURE

CROSS-REFERENCE TO RELATED APPLICATIONS

This application is the National Stage of International Application No. PCT/JP2015/055673, filed 26 Feb. 2015, having the title "BENT PIPE STRUCTURE" which claims the benefit of and priority to Japanese Application No. 2014-055591, filed on 18 Mar. 2014, the contents of all of which are incorporated by reference as if fully set forth herein.

TECHNICAL FIELD

The present invention relates to a bent pipe structure to be employed in a bent part of piping that configures a fluid flow path.

BACKGROUND ART

Patent Document 1 (Japanese Patent Application Laid-Open (JP-A) No. 2001-219453) describes a bent pipe molding mold configured from an outer mold and an inner mold. The outer mold, which forms an outer face of the bent pipe, is configured by a two-piece split mold structure for molding the outer face of the bent pipe. The inner mold, which forms an inner face of the bent pipe, has a structure that is configured by members capable of being separated from each other or combined with each other in directions relatively approaching or moving apart along a direction of an axial line of the bent pipe.

SUMMARY OF INVENTION

Technical Problem

However, in the configuration described in Patent Document 1, a curved portion at a bend direction inside of a bend of a pipe body is configured by a sharp corner (namely, R=0) rather than by a circular arc shape. Therefore, there is an increase in pressure drop in fluid flowing through the bend.

An object of the present invention is, in a bend of a pipe body, to mitigate an increase in pressure drop in fluid flowing through the bend.

Solution to Problem

A bent pipe structure of a first aspect of the present invention includes a pipe body that includes a bend, and a cross-sectional area enlargement portion that is formed by configuring a curved portion with a circular arc shape at an inner circumferential face on a bend direction inside of the bend so as to enlarge a cross-sectional area of a flow path of the pipe body. The cross-sectional area enlargement portion includes a pair of side face portions that face each other along an orthogonal direction orthogonal to an axial line of the pipe body, and a bottom face portion that couples lower ends of the side face portions together. When viewed along the direction of the axial line, the cross-sectional area enlargement portion is formed in a curved shape that protrudes toward an outer circumferential side of the pipe body. The bent pipe structure satisfies the following relationships, wherein P (mm) denotes the inner diameter of the pipe body, H (mm) denotes the separation distance between the pair of side face portions, as viewed along the direction of the axial line, and R (mm) denotes the radius of the curved portion:

R=1 when P=6 and H=1,
R=1 when P=6 and H=2,
R=1 or greater and R=2 or less when P=6 and H=3,
R=1 when P=6 and H=4,
R=3 or greater and R=5 or less when P=16 and H=5,
R=3 or greater and R=5 or less when P=16 and H=7,
R=3 or greater and R=7 or less when P=16 and H=9,
R=3 or greater and R=7 or less when P=16 and H=11,
R=3 or greater and R=5 or less when P=16 and H=13,
R=3 when P=16 and H=15,
R=7 when P=23 and H=8,
R=7 when P=23 and H=10,
R=7 when P=23 and H=12,
R=7 when P=23 and H=14,
R=7 or greater and R=10 or less when P=23 and H=16,
R=7 when P=23 and H=18, and
R=7 when P=23 and H=20.

According to the above configuration, the cross-sectional area enlargement portion is formed by configuring the curved portion of the inner circumferential face with a circular arc shape at the inner circumferential face on a bend direction inside of the bend of the pipe body so as to enlarge a cross-sectional area of the flow path of the pipe body. Moreover, when viewed along the direction of the axial line, the cross-sectional area enlargement portion is formed in a curved shape that protrudes toward an outer circumferential side of the pipe body.

The bent pipe structure satisfies specific relationships, where P (mm) denotes the inner diameter of the pipe body, H (mm) denotes the separation distance between the pair of side face portions, as viewed along the direction of the axial line, and R (mm) denotes the radius of the curved portion.

Accordingly, an increase in pressure drop in fluid flowing through the bend may be mitigated at the bend of the pipe body.

A bent pipe structure of a second aspect of the present invention includes a pipe body that includes a bend and a cross-sectional area enlargement portion that is formed by configuring a curved portion with a circular arc shape at an inner circumferential face on a bend direction inside of the bend so as to enlarge a cross-sectional area of a flow path of the pipe body. The cross-sectional area enlargement portion includes a pair of side face portions that face each other along an orthogonal direction orthogonal to an axial line of the pipe body, and a bottom face portion that couples lower ends of the side face portions together. When viewed along the direction of the axial line, the side face portions are formed with straight lines and the bottom face portion is formed in a curved shape that protrudes toward an outer circumferential side of the pipe body. The bent pipe structure satisfies the following relationships, wherein P (mm) denotes the inner diameter of the pipe body, H (mm) denotes the separation distance between the pair of side face portions, as viewed along the direction of the axial line, and R (mm) denotes the radius of the curved portion.

R=2 or greater and R=3 or less when P=6 and H=1,
R=2 when P=6 and H=2,
R=7 or greater and R=11 or less when P=16 and H=5,
R=7 or greater and R=9 or less when P=16 and H=7,
R=7 or greater and R=16 or less when P=23 and H=6,
R=10 or greater and R=13 or less when P=23 and H=8,
R=10 or greater and R=13 or less when P=23 and H=10,
R=10 or greater and R=13 or less when P=23 and H=12, and
R=10 when P=23 and H=14.

According to the above configuration, the cross-sectional area enlargement portion is formed by configuring the curved portion of the inner circumferential face with a circular arc shape at the inner circumferential face on a bend direction inside of the bend of the pipe body so as to enlarge a cross-sectional area of the flow path of the pipe body. Moreover, when viewed along the direction of the axial line, the side face portions are formed with straight lines and the bottom face portion is formed in a curved shape that protrudes toward an outer circumferential side of the pipe body.

The bent pipe structure satisfies specific relationships, where P (mm) denotes the inner diameter of the pipe body, H (mm) denotes the separation distance between the pair of side face portions, as viewed along the direction of the axial line, and R (mm) denotes the radius of the curved portion.

Accordingly, an increase in pressure drop in fluid flowing through the bend may be mitigated at the bend of the pipe body.

Effects of Invention

The present invention is, in a bend of a pipe body, capable of mitigating an increase in pressure drop in fluid flowing through the bend.

BRIEF DESCRIPTION OF DRAWINGS

FIG. 10A is a figure illustrating a table of analysis results for a pipe body provided with a bent pipe structure according to the first exemplary embodiment of the present invention.

FIG. 10B is a figure illustrating a table of analysis results for a pipe body according to a comparative example.

FIG. 11A is a figure illustrating a table of analysis results for a pipe body provided with a bent pipe structure according to the first exemplary embodiment of the present invention.

FIG. 11B is a figure illustrating a table of analysis results for a pipe body according to a comparative example.

FIG. 12A is a figure illustrating a table of analysis results for a pipe body provided with a bent pipe structure according to the first exemplary embodiment of the present invention.

FIG. 12B is a figure illustrating a table of analysis results for a pipe body according to a comparative example.

FIG. 19A is a figure illustrating a table of analysis results for a pipe body provided with a bent pipe structure according to the second exemplary embodiment of the present invention.

FIG. 19B is a figure illustrating a table of analysis results for a pipe body according to a comparative example.

FIG. 20A is a figure illustrating a table of analysis results for a pipe body provided with a bent pipe structure according to the second exemplary embodiment of the present invention.

FIG. 20B is a figure illustrating a table of analysis results for a pipe body according to a comparative example.

FIG. 21A is a figure illustrating a table of analysis results for a pipe body provided with a bent pipe structure according to the second exemplary embodiment of the present invention.

FIG. 21B is a figure illustrating analysis results for a pipe body according to a comparative example.

DESCRIPTION OF EMBODIMENTS

First Exemplary Embodiment

Explanation follows regarding an example of a bent pipe structure according to a first exemplary embodiment of the present invention, with reference to FIG. 1A to FIG. 15.

Bent Pipe Structure

Figure 4:
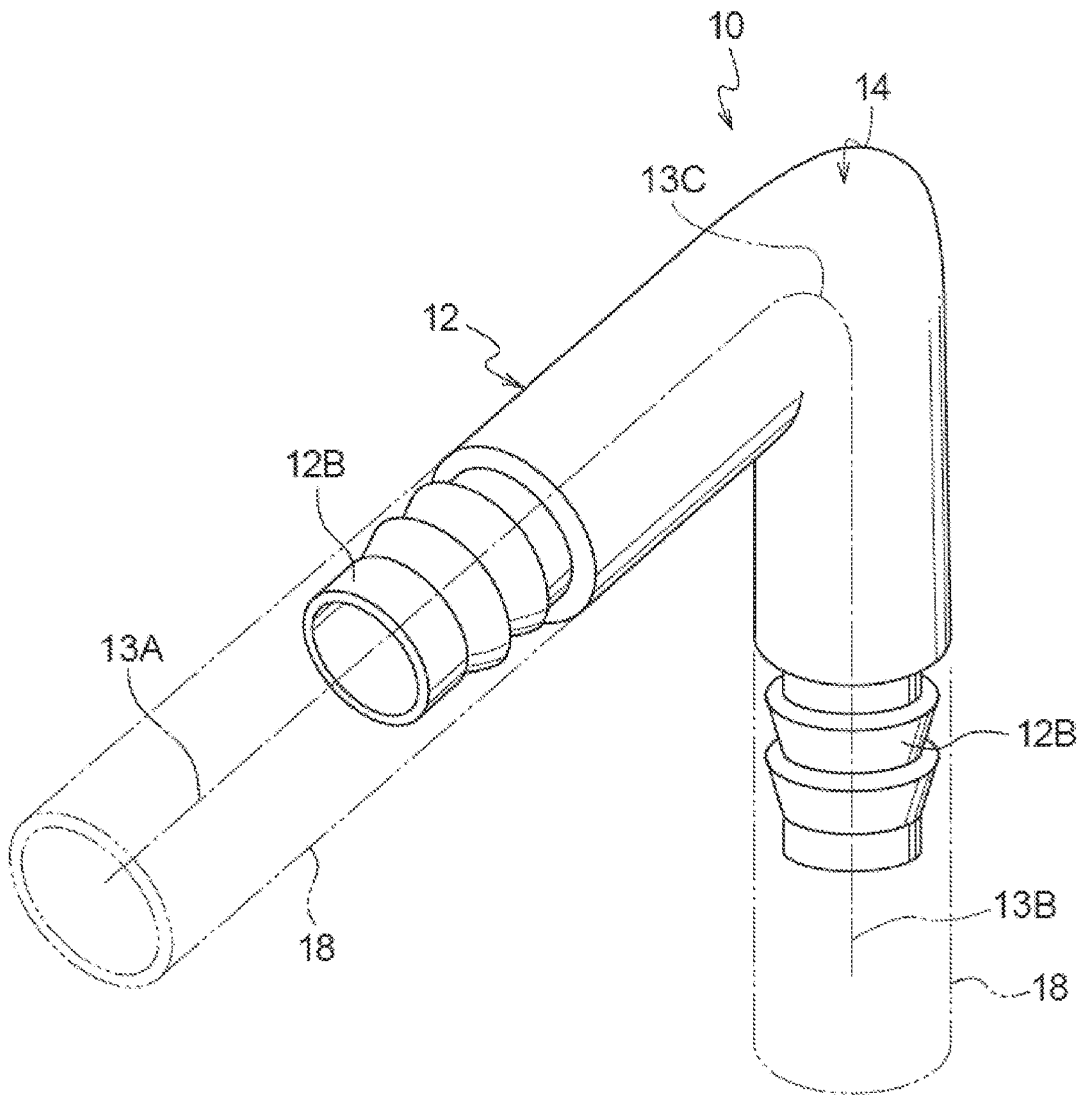
FIG. 4 is a perspective view illustrating a pipe body provided with a bent pipe structure according to the first exemplary embodiment of the present invention.

As illustrated in FIG. 4, a flow path with a circular cross-section is formed running along an axial line 13 of a pipe body 12 of a bent pipe 10, and the pipe body 12 includes a bend 14 at a part where the axial line 13 is bent at substantially a right angle. Namely, the axial line 13 is configured from a first straight line portion 13A extending in a straight line shape at an entrance side of the pipe body 12, a second straight line portion 13B extending in a straight line shape at an exit of the pipe body 12, and a circular arc portion 13C that has a circular arc shape and couples an end portion of the first straight line portion 13A and the second straight line portion 13B together.

Both end portions 12B of the pipe body 12 are open, and, for example, both end portions 12B are respectively coupled to a hose 18.

Figure 1A:
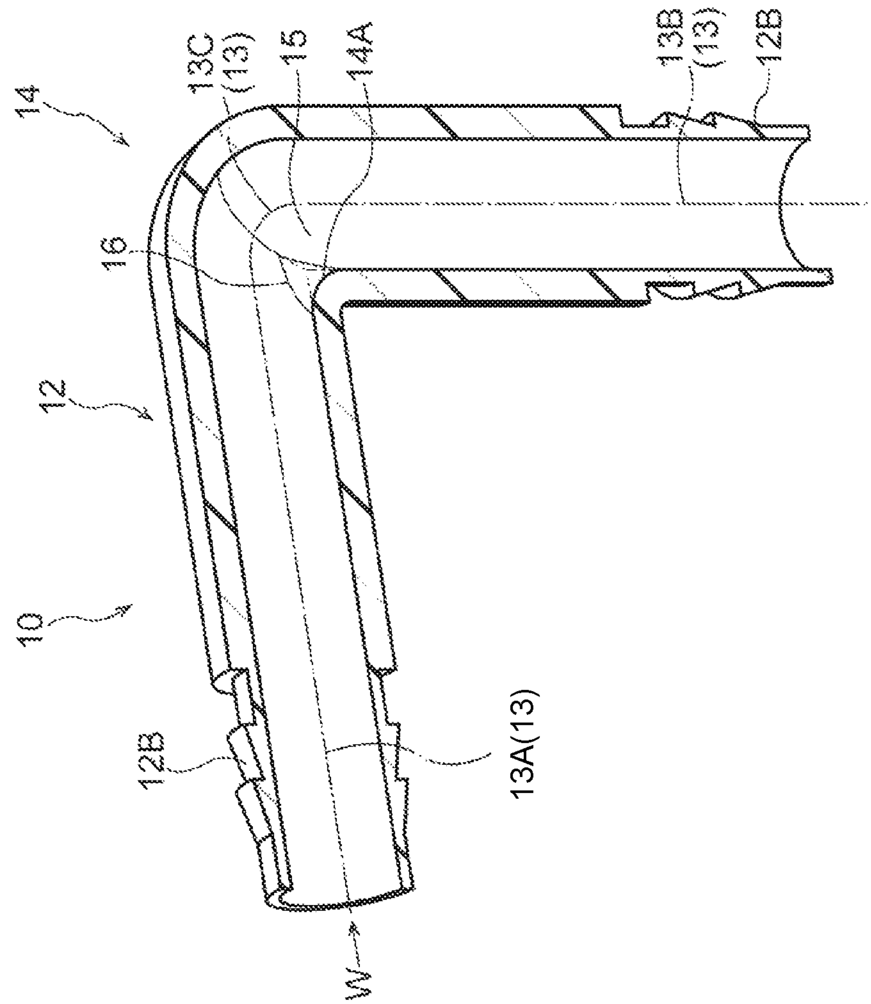
FIG. 1A is a perspective cross-section view illustrating a pipe body provided with a bent pipe structure according to a first exemplary embodiment of the present invention.
Figure 1B:
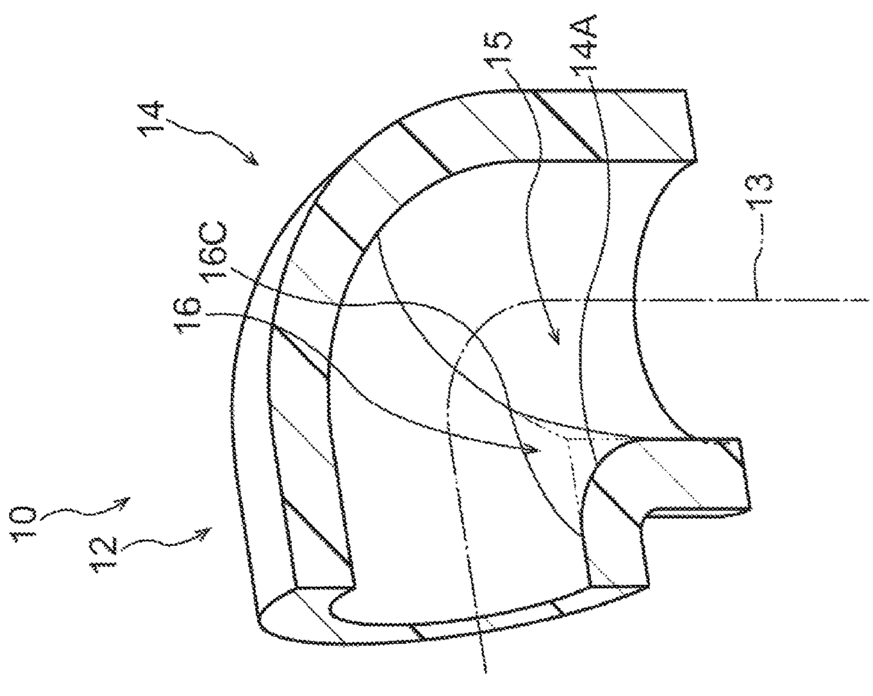
FIG. 1B is an enlarged perspective cross-section view illustrating a pipe body provided with a bent pipe structure according to the first exemplary embodiment of the present invention.
Figure 2:
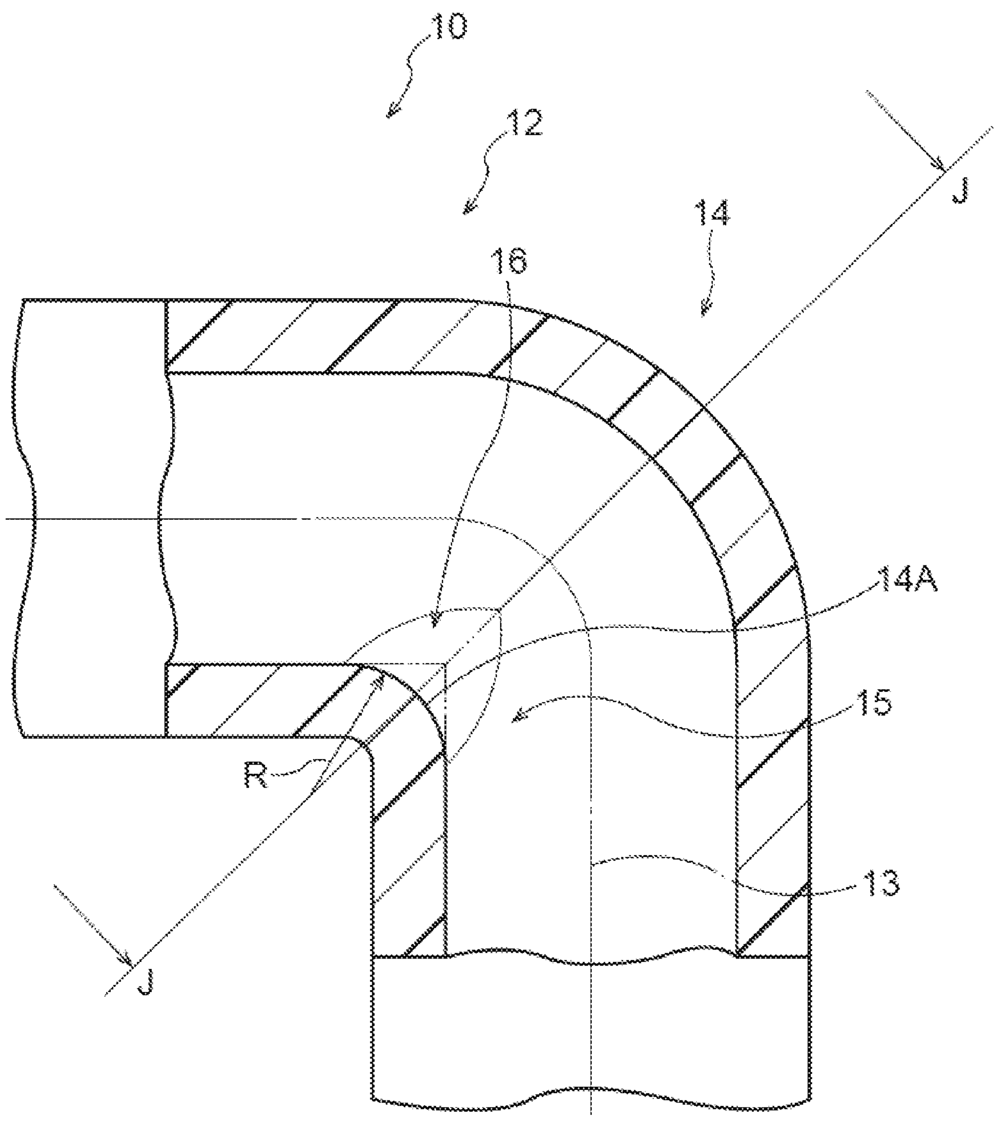
FIG. 2 is a side cross-section illustrating a pipe body provided with a bent pipe structure according to the first exemplary embodiment of the present invention.

As illustrated in FIG. 1A, FIG. 1B, and FIG. 2, a curved portion 14A at an inner circumferential face 15 on a bend direction inside of the bend 14 is configured with a circular arc shape. By configuring the curved portion 14A with a circular arc shape, a recess 16, serving as an example of a cross-sectional area enlargement portion that enlarges the cross-sectional area of the flow path of the pipe body 12 running along the direction of the axial line 13, is formed in the inner circumferential face 15 on the bend direction inside of the bend 14.

The recess 16 enlarges the cross-sectional area of the flow path at the bend 14, such that when a fluid such as a liquid passes through the inside of the bend 14 (namely, a fluid flowing along arrow W in FIG. 1A), an increase in pressure drop in the fluid can be suppressed at the recess 16. Note that the bend direction inside is the side where the pipe body 12 is constricted along the bend direction (namely, the direction of the bend).

Explanation follows regarding the recess 16 of the pipe body 12 in comparison to a pipe body 102 of a bent pipe 100 of a comparative example (namely, a conventional form).

First, explanation is given regarding the pipe body 102 of the bent pipe 100 according to the comparative example.

Figure 13A:
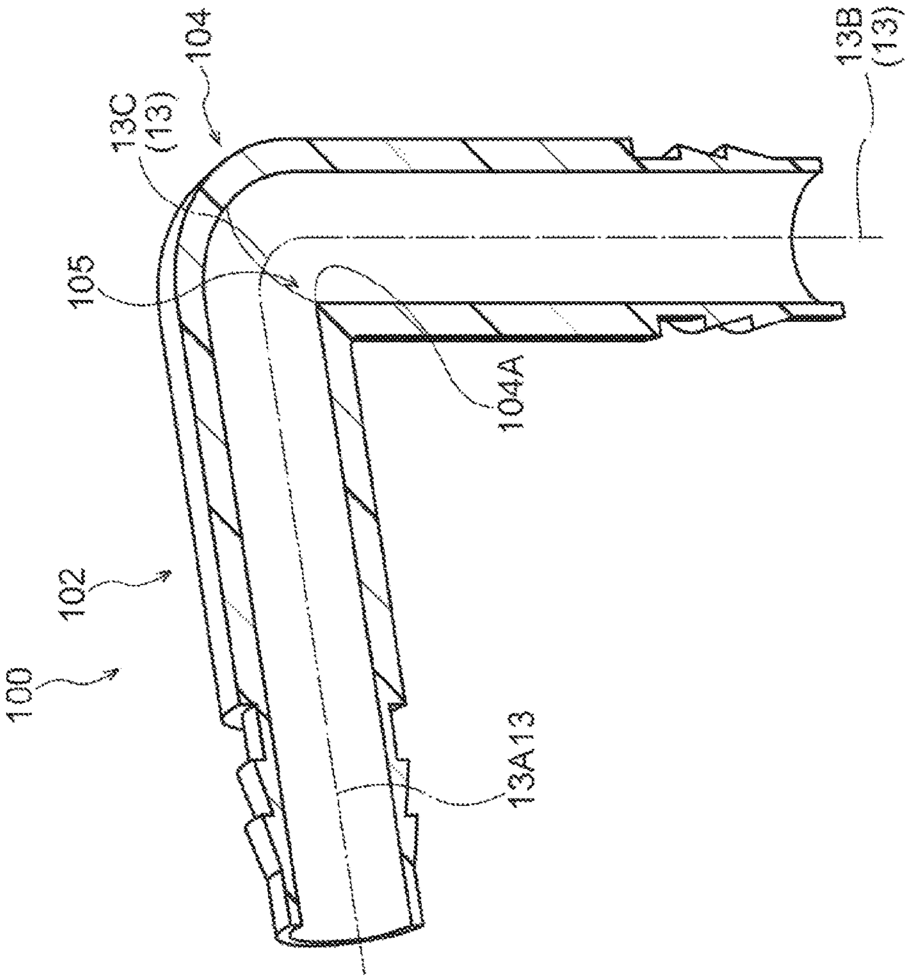
FIG. 13A is a perspective cross-section view illustrating a pipe body provided with a bent pipe structure according to a comparative example to a bent pipe structure according to the first exemplary embodiment of the present invention.
Figure 13B:
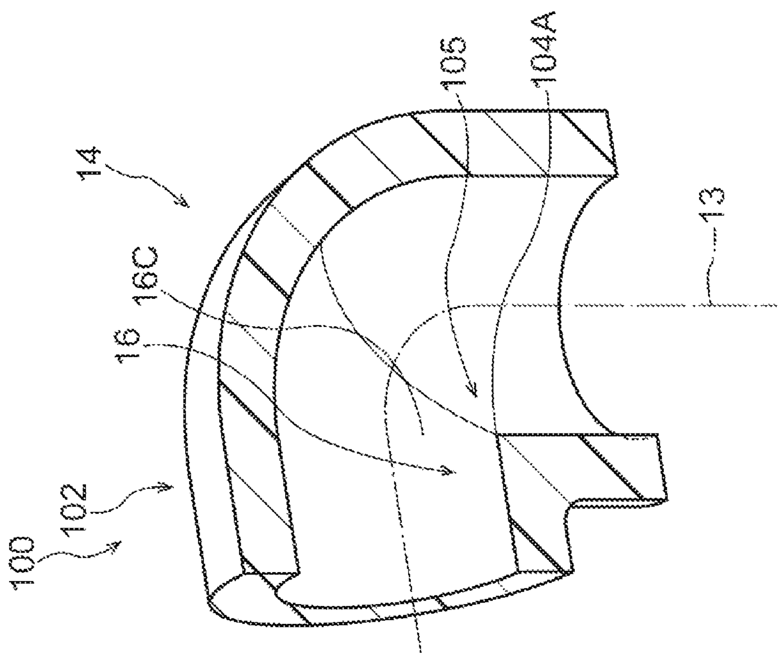
FIG. 13B is an enlarged perspective cross-section view illustrating a pipe body provided with a bent pipe structure according to a comparative example to a bent pipe structure according to the first exemplary embodiment of the present invention.
Figure 14:
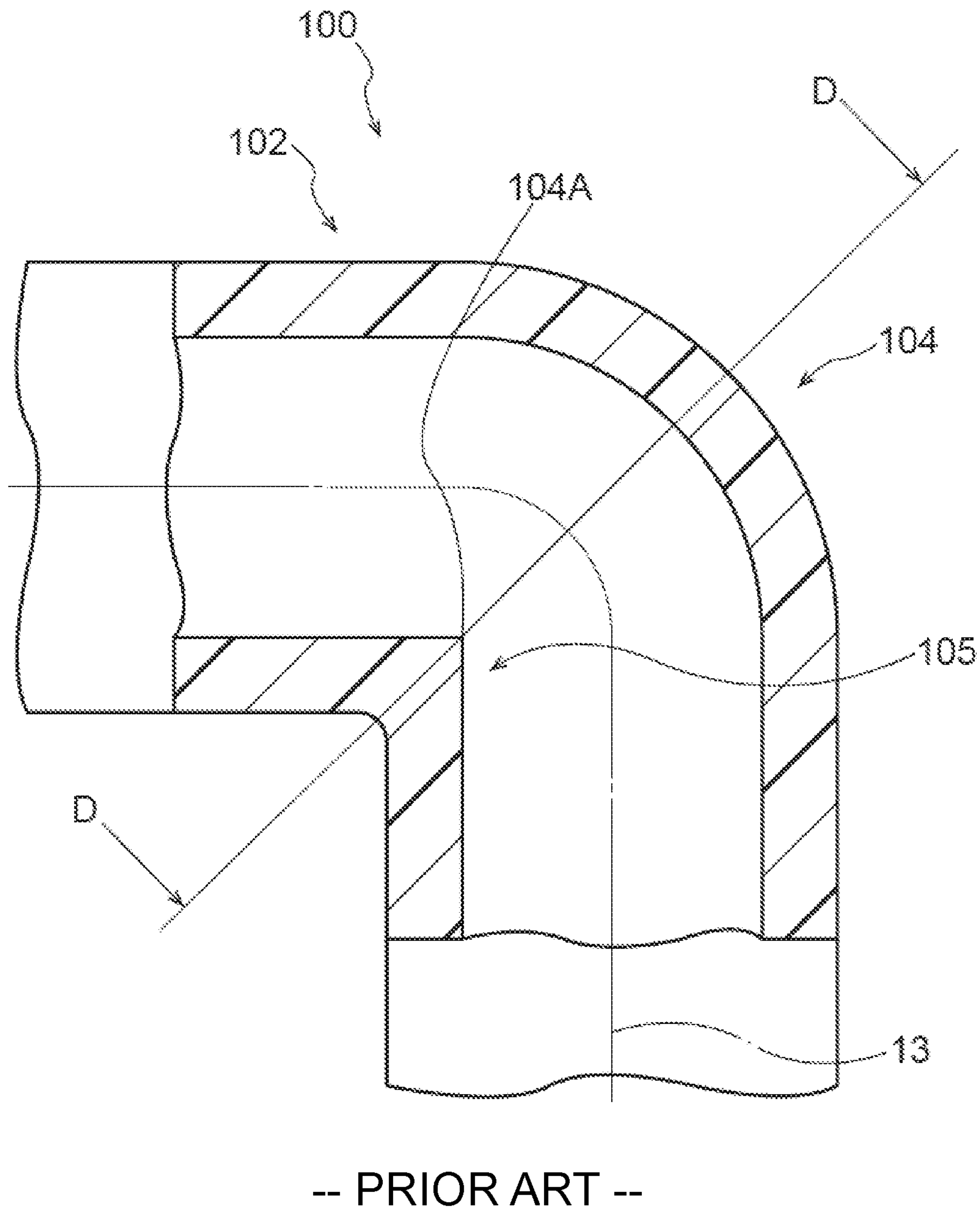
FIG. 14 is a side cross-section illustrating a pipe body provided with a bent pipe structure according to a comparative example to a bent pipe structure according to the first exemplary embodiment of the present invention.

As illustrated in FIG. 13A, FIG. 13B, and FIG. 14, in the pipe body 102 of the bent pipe 100 according to the comparative example, a curved portion 104A at an inner circumferential face 105 on a bend direction inside of a bend 104 is configured by a sharp corner (namely, a state not configured by a circular arc shape). Thus, a recess that enlarges the cross-sectional area of a flow path of the pipe body 102 is not formed in the inner circumferential face 105 on the bend direction inside of the bend 104 of the bent pipe 100.

Figure 15:
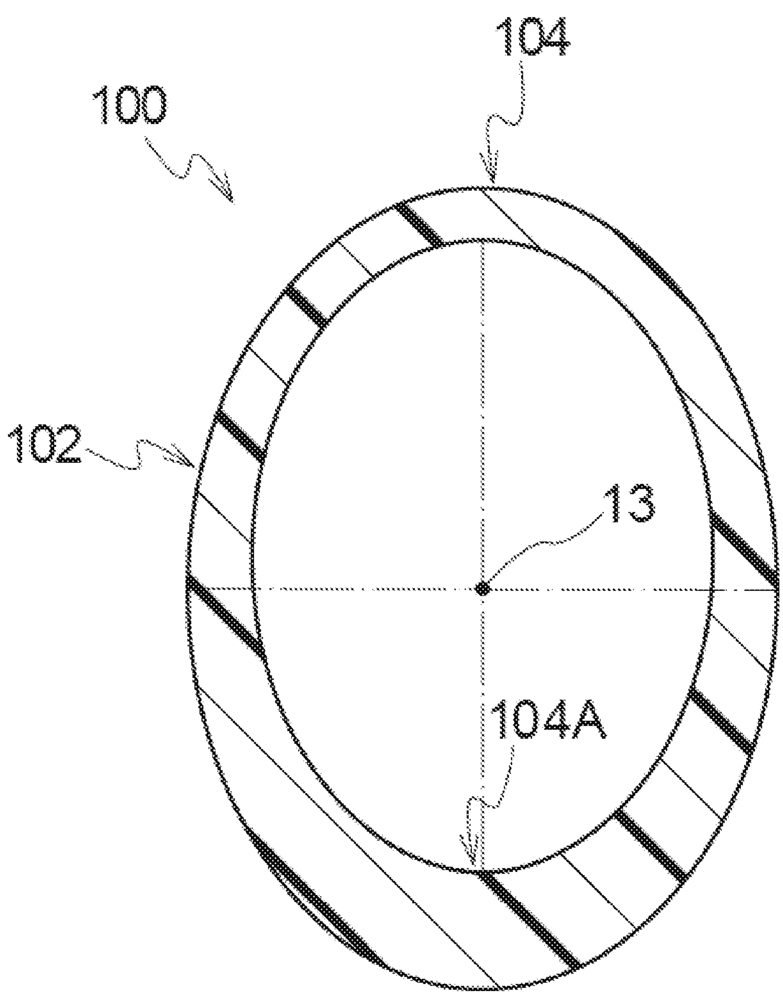
FIG. 15 is a cross-section illustrating a pipe body provided with a bent pipe structure according to a comparative example to a bent pipe structure according to the first exemplary embodiment of the present invention.

A cross-section of the bend 104, sectioned along the bend 104 as viewed along an orthogonal direction that is orthogonal to the direction of the axial line 13 (a direction orthogonal to the first straight line portion 13A and the second straight line portion 13B, and the direction into the page in FIG. 2 and FIG. 14; referred to below as an "axis orthogonal direction") (a cross-section taken along line D-D in FIG. 14), has a shape as illustrated in FIG. 15. As illustrated in FIG. 15, the flow path in the cross-section of the bend 104 has an elliptical shape centered about the axial line 13. In other words, the flow path has an elliptical shape centered about the axial line 13 when viewing the flow path of the bend 104 along the direction of the axial line 13.

In contrast thereto, as illustrated in FIG. 2, the curved portion 14A at the inside of the bend 14 in the pipe body 12 of the bent pipe 10 has a curved arc shape as described above. The radius R illustrated in FIG. 2 denotes a curvature R of the curved portion 14A.

Figure 3:
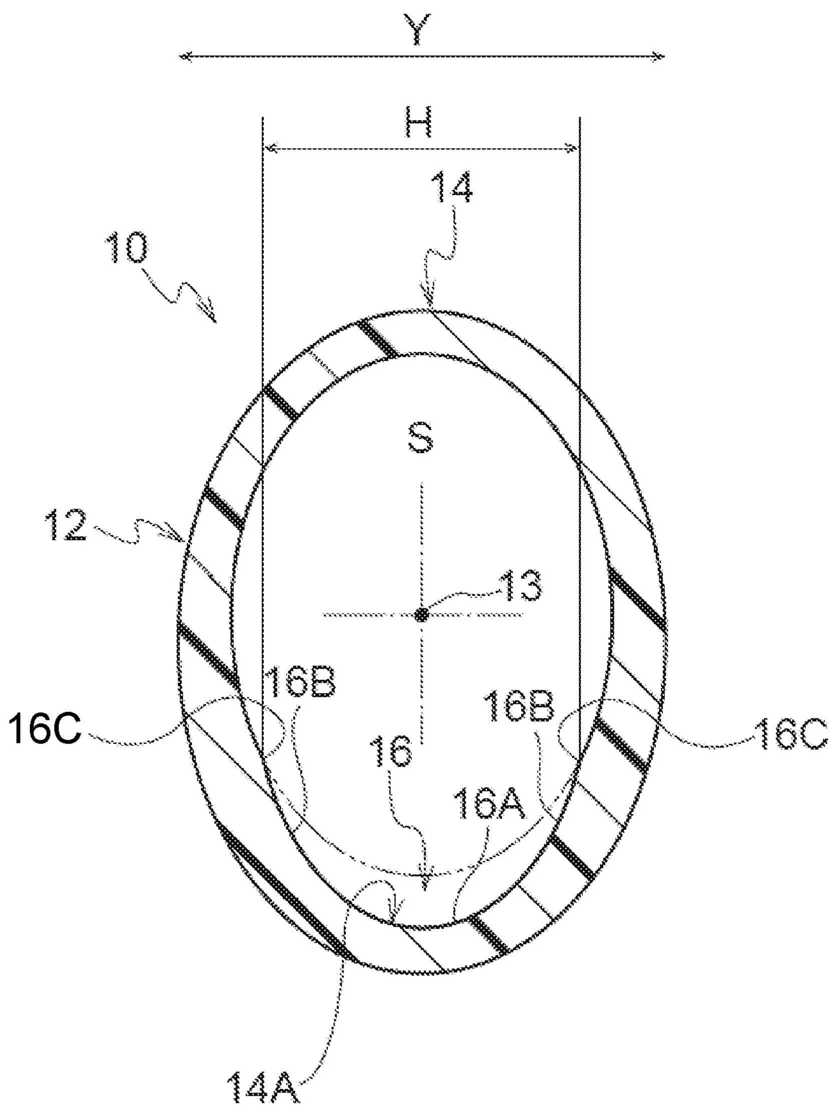
FIG. 3 is a cross-section illustrating a bend of a pipe body provided with a bent pipe structure according to the first exemplary embodiment of the present invention.

A cross-section of the bend 14, sectioned as viewed along the axis orthogonal direction (a cross-section along line J-J in FIG. 2), has a shape as illustrated in FIG. 3. As illustrated in FIG. 3, the bend 14 is formed with the recess 16, described above, so as to enlarge the flow path with respect to the elliptical shape centered about the axial line 13.

Specifically, the recess 16 is configured from a pair of side face portions 16B that face each other along the axis orthogonal direction (the arrow Y direction in FIG. 3), and a bottom face portion 16A that couples respective lower ends of the side face portions 16B together. The recess 16 has a curved shape that protrudes toward the outer circumferential face of the pipe body 12. In other words, when viewing the flow path of the bend 14 along the direction of the axial line 13, the recess 16 has a curved shape that protrudes toward the outer circumferential face of the pipe body 12. In the present exemplary embodiment, when viewing the flow path of the bend 14 along the axial line 13 direction, the pair of side face portions 16B are configured with circular arc shapes having shapes that are symmetrical to each other, and the bottom face portion 16A is configured with a circular arc shape that smoothly links the pair of side face portions 16B together. The dimension H illustrated in FIG. 3 denotes the width of the recess 16 (width H).

FIG. 1A, FIG. 1B, FIG. 2, and FIG. 3 illustrate the shape of the pipe body 102 according to the comparative example with a double-dotted dashed line. Accordingly, in the bend 14 of the pipe body 12, it is apparent that due to forming the recess 16 in the bend 14, the cross-sectional area of the flow path of the bend 14 is enlarged compared to that of the bend 104 of the pipe body 102 according to the comparative example.

Note that as illustrated in FIG. 2, the curvature R described above has a curvature that gradually changes so as to become 0 (mm) at end portions 16C of the recess 16 along the axis orthogonal direction.

Bent Pipe Molding Mold

Explanation follows regarding a mold employed in molding the pipe body 12.

Figure 7:
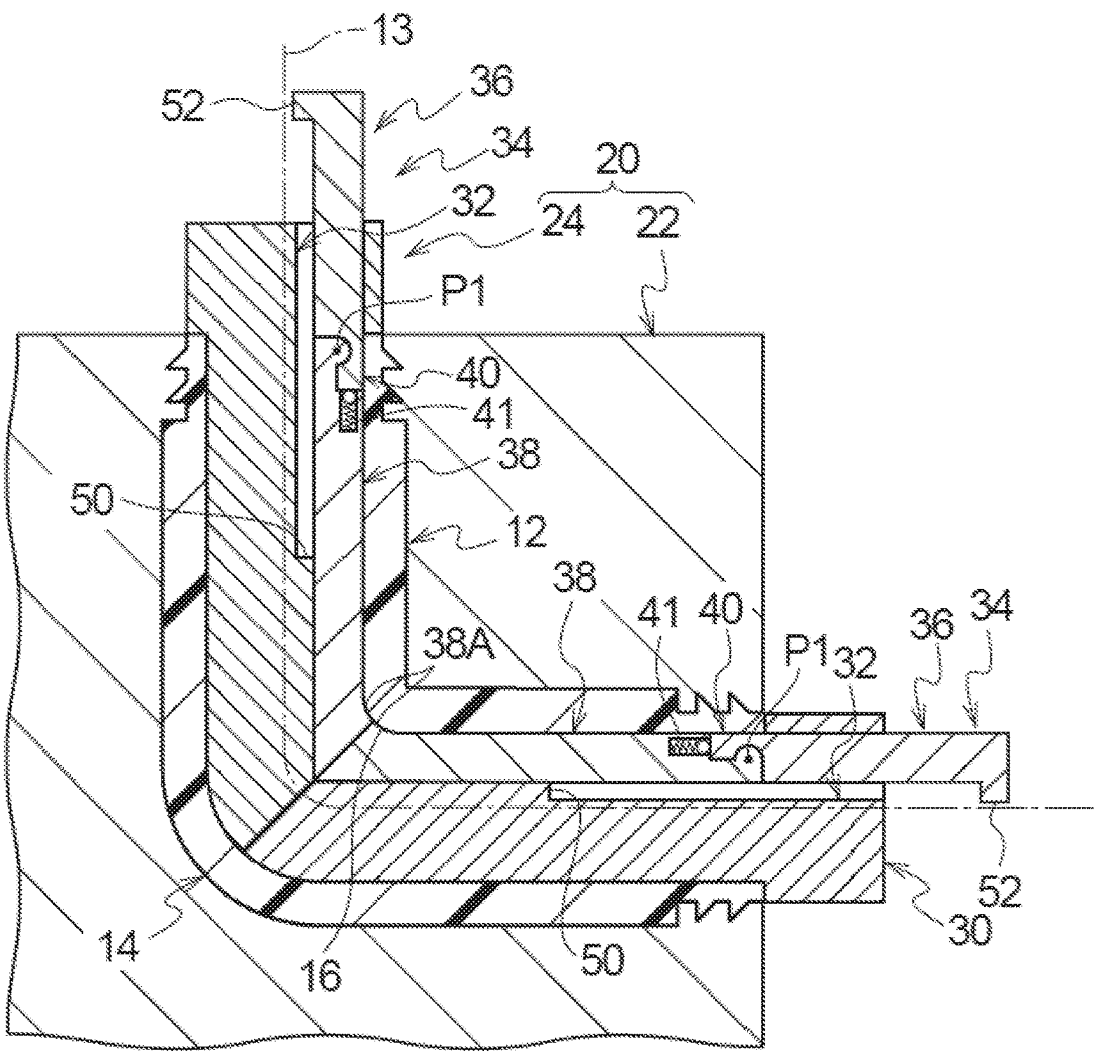
FIG. 7 is a perspective view illustrating a mold employed for molding a pipe body provided with a bent pipe structure according to the first exemplary embodiment of the present invention.

As illustrated in FIG. 7, a bent pipe molding mold 20 of the present exemplary embodiment includes an outer mold 22 and an inner mold 24. The outer mold 22 has a two-piece split mold structure, and forms the outer circumferential face of the pipe body 12, which is made of synthetic resin and molded by injection molding. The inner mold 24 molds the inner circumferential face 15 of the pipe body 12. The inner mold 24 includes a pair of primary cores 30 having the same shape as each other, and a pair of hinged cores 34 (secondary cores) having the same shape as each other and serving as secondary cores. Each primary core 30 and each hinged core 34 has an elongated shape running along the direction of the axial line 13 of the pipe body 12. At a central portion of the bend 14 along the direction of the axial line 13, the respective primary cores 30 and the respective hinged cores 34 can be separated from each other or combined with each other along the direction of the axial line 13 by being pulled apart from each other or being moved closer together along the direction of the axial line 13 of the pipe body 12.

Figure 5:
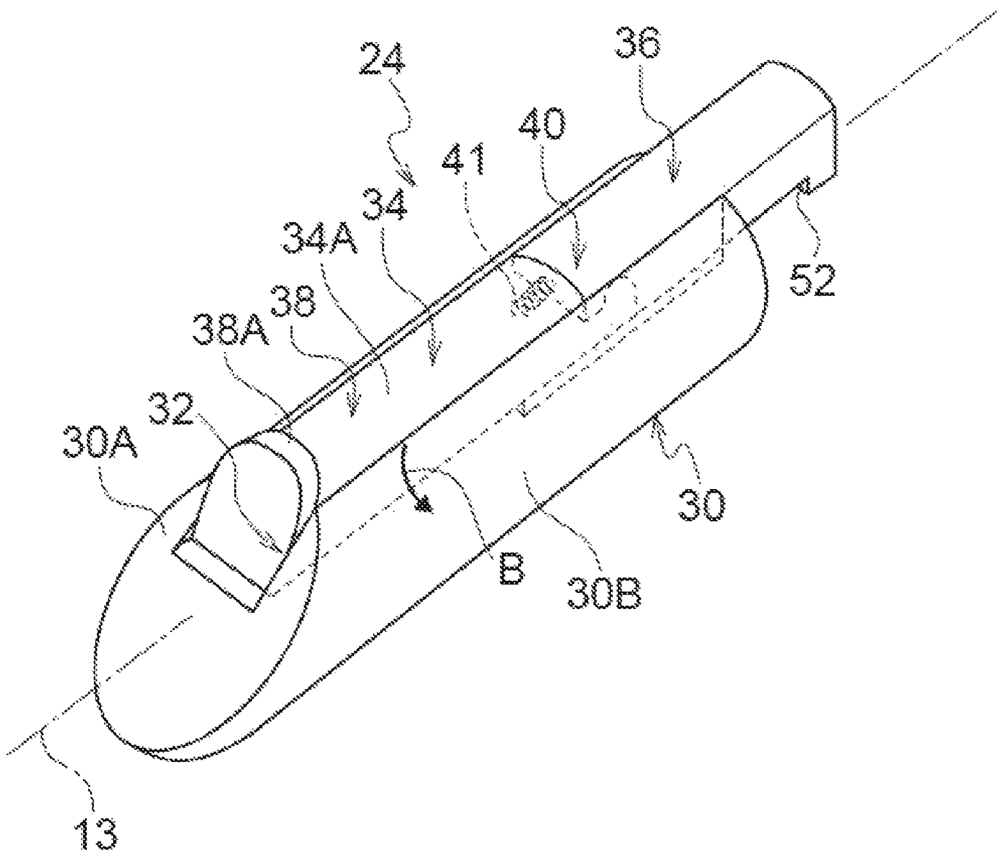
FIG. 5 is a perspective view illustrating a mold employed for molding a pipe body provided with a bent pipe structure according to the first exemplary embodiment of the present invention.
Figure 6:
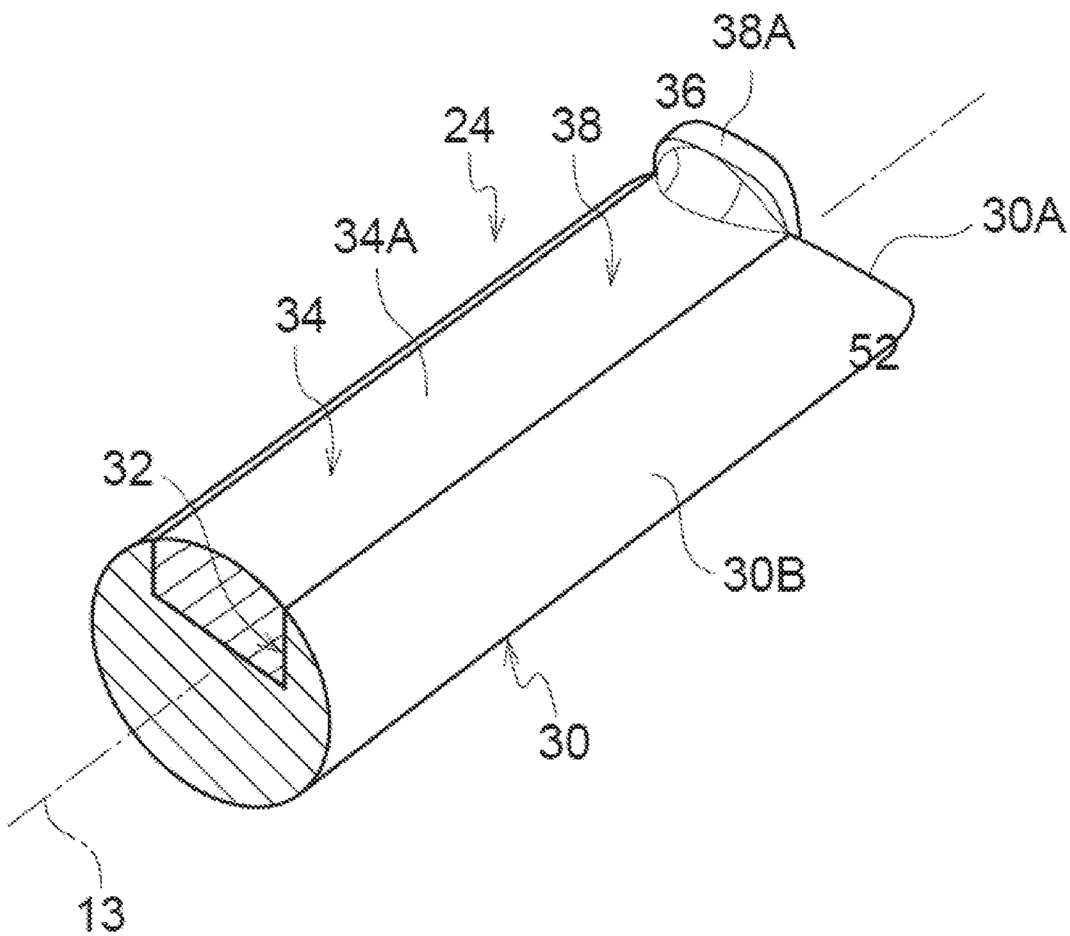
FIG. 6 is a perspective view illustrating a mold employed for molding a pipe body provided with a bent pipe structure according to the first exemplary embodiment of the present invention.

As illustrated in FIG. 5 and FIG. 6, a groove 32 is formed in each primary core 30 along the direction of the axial line 13 of the pipe body 12 at a location corresponding to the inner circumferential face 15 on the bend direction inside of the bend 14 (see FIG. 1). A leading end portion 30A of each primary core 30 accordingly has a shape that does not engage with an undercut portion of the recess 16 in the inner circumferential face 15 on the bend direction inside of the bend 14 of the pipe body 12.

Each hinged core 34 is inserted into the respective grooves 32 of the primary cores 30 so as to be capable of sliding relative to the primary core 30 along the direction of the axial line 13 of the pipe body 12. Note that the inner circumferential face 15 of the pipe body 12 is molded by curved molding faces 30B of the primary cores 30 and curved molding faces 34A of the hinged cores 34. A base portion 36 at one length direction side of each hinged core 34 and a swinging portion 38 at another length direction side of each hinged core 34 are coupled together by a hinge 40.

As illustrated in FIG. 7, recesses of the respective base portions 36, which are formed with semicircular shapes as viewed from a side orthogonal to the direction of the axial line 13, and protrusions of the swing portions 38, engage with each other at the hinges 40 of the hinged cores 34. Each swinging portions 38 swings with respect to the base portion 36 about an axis P1 of the respective hinge 40, in a direction approaching the axial line 13 (arrow B direction in FIG. 5) and in a direction going away from the axial line 13 (direction opposite to that of arrow B in FIG. 5). Moreover, each hinge 40 has a built-in coil spring 41, serving as a biasing means, and the respective swinging portion 38 swing with respect to the base portion 36 in the direction approaching the axial line 13 (the arrow B direction in FIG. 5) due to the biasing force of the coil spring 41. Namely, each swinging portion 38 is biased in the arrow B direction in FIG. 5 by the respective hinge 40, and is pressed against the bottom of the groove 32.

Leading ends 38A of the swinging portions 38 of the respective hinged cores 34 correspond to the undercut portion of the recess 16 that is to be formed in the inner circumferential face 15 on the bend direction inside of the bend 14 of the pipe body 12, and have curved shapes that engage with the recess 16.

Namely, in the molding position illustrated in FIG. 7, the leading ends 38A of the swinging portions 38 of the pair of hinged cores 34 are positioned so as to form the recess 16, this being in the inner circumferential face 15 on the bend direction inside of the bend 14 of the pipe body 12. The swinging portions 38 of the pair of hinged cores 34 are housed in the respective groove 32 of each primary core 30, these being in the molding position.

Figure 8:
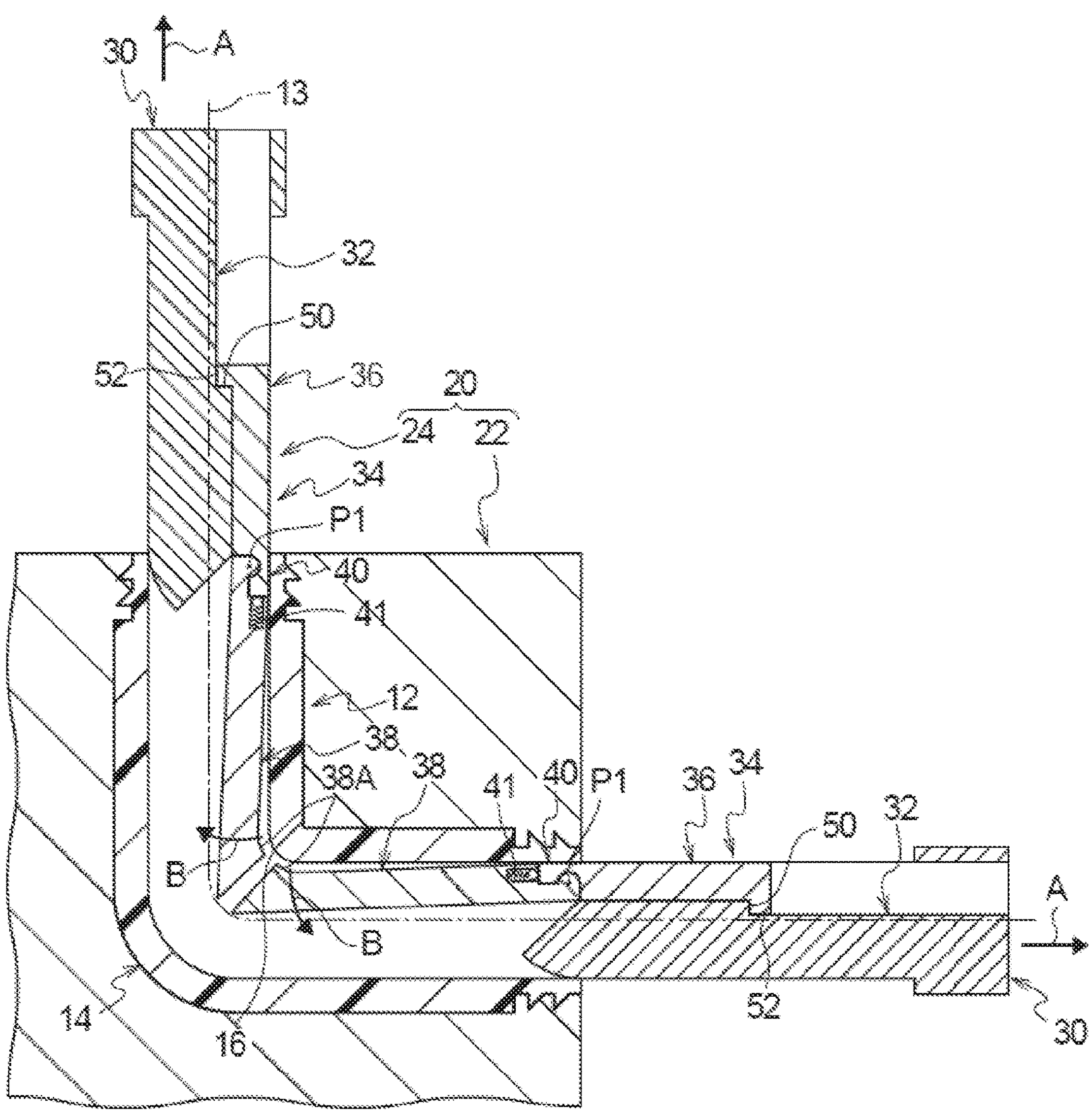
FIG. 8 is a perspective view illustrating a mold employed for molding a pipe body provided with a bent pipe structure according to the first exemplary embodiment of the present invention.

As illustrated in FIG. 8, when the pair of primary cores 30 are separated from each other and respectively move from the molding position along a retracted position direction (the arrow A direction in FIG. 8), the swinging portion 38 of each hinged core 34 is swung in the arrow B direction in FIG. 8 by the respective hinge 40. Namely, the swinging portion 38 of each hinged core 34 swings from its molding position illustrated in FIG. 7, toward the space left at the molding position of the respective primary core 30 by the primary core 30 moving away (to a swung position of the swinging portion 38), as illustrated in FIG. 8.

Figure 9:
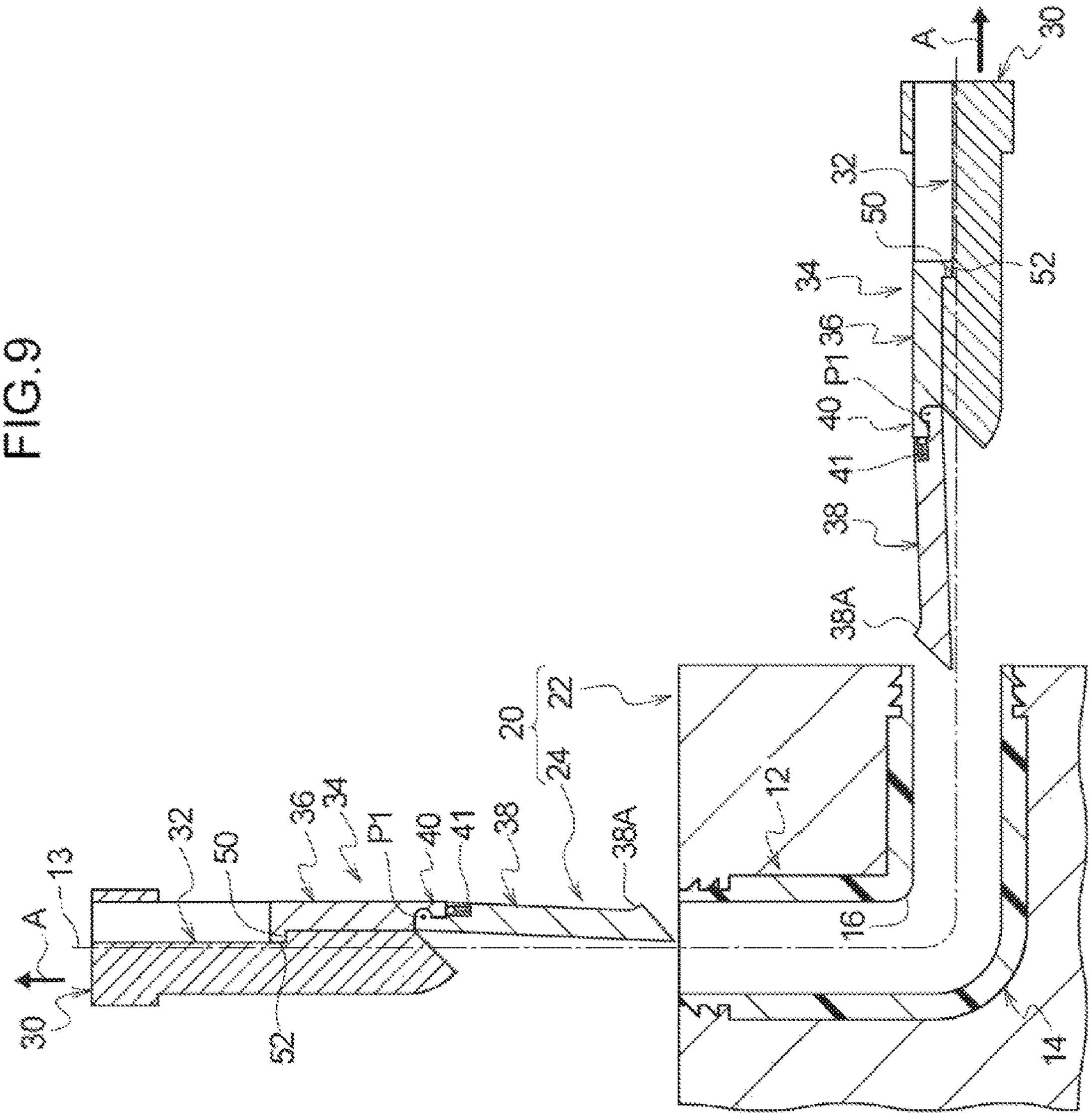
FIG. 9 is a perspective view illustrating a mold employed for molding a pipe body provided with a bent pipe structure according to the first exemplary embodiment of the present invention.

As illustrated in FIG. 9, when the pair of primary cores 30 respectively move further along the retracted position direction (the arrow A direction in FIG. 9), engagement portions 50 formed in the leading ends of the grooves 32 of the pair of primary cores 30 respectively engage with protrusion 52 formed on the base portion 36 of each hinged core 34. The respective hinged cores 34 thereby move together with the pair of primary cores 30 in the arrow A direction in FIG. 9, and the inner mold 24 is separated from the pipe body 12.

In order to mold the pipe body 12 using the bent pipe molding mold 20 of the present exemplary embodiment, first, a synthetic resin is injected into the space formed between the outer mold 22 and the inner mold 24, and the pipe body 12 of the bent pipe that includes the recess 16 is molded. Then, the outer mold 22 is removed and the inner mold 24 is separated from the pipe body 12.

When this is performed, the pair of primary cores 30 are separated by each being pulled, with respect to each of the pair of hinged cores 34, from the molding position illustrated in FIG. 7, along the grooves 32 in a pull-out direction running along the axial line 13 (the arrow A direction in FIG. 8). After the pair of primary cores 30 have been separated and moved in the direction toward the retracted position from the molding position, the swinging portion 38 of each hinged core 34 swings through the respective hinge 40 toward the space at the molding position of the respective primary core 30 arising from moving the primary cores 30. The swinging portion 38 of each hinged core 34 thereby adopts the swung position illustrated in FIG. 8. Next, as illustrated in FIG. 9, when the pair of primary cores 30 are moved even further along the retracted position direction (the arrow A direction in FIG. 9), the engagement portion 50 formed in the leading end of each groove 32 of the pair of primary cores 30 engages with the protrusion 52 formed in the base portion 36 of the respective hinged core 34. The respective hinged cores 34, together with the pair of primary cores 30, then move along the arrow A direction in FIG. 9, and the inner mold 24 can be easily removed from the pipe body 12.

Evaluation

Next, explanation follows regarding an evaluation method, evaluation specifications, evaluation items, and evaluation results that were evaluated by analyzing the pipe body 12 according to the first exemplary embodiment and the pipe body 102 according to the comparative example.

1. Evaluation Method

Analysis was performed using ANSYS Fluent from ANSYS Japan K.K.

The flow rate of fluid flowing through the inside of the pipe body was set to 50 L/min.

The fluid (medium) density of fluid flowing through the inside of the pipe body was set to 1.046 kg/m$^3$ and the fluid (medium) viscosity was set to 0.00191 Pa·s, so as to configure the fluid as cooling water with a 30% concentration (Long Life Coolant: LLC).

2. Evaluation Specifications (1) The following specifications were used for the present exemplary embodiment.

A pipe body 12 having an inner diameter of 6 mm, a recess 16 having a width H of 1 mm, and a curved portion 14A having a curvature R of 1 mm.

A pipe body 12 having an inner diameter of 6 mm, a recess 16 having a width H of 2 mm, and a curved portion 14A having a curvature R of 1 mm.

A pipe body 12 having an inner diameter of 6 mm, a recess 16 having a width H of 3 mm, and a curved portion 14A having a curvature R of 1 mm or 2 mm.

A pipe body 12 having an inner diameter of 6 mm, a recess 16 having a width H of 4 mm, and a curved portion 14A having a curvature R of 1 mm.

A pipe body 12 having an inner diameter of 16 mm, a recess 16 having a width H of 5 mm, and a curved portion 14A having a curvature R of 3 mm or 5 mm.

A pipe body 12 having an inner diameter of 16 mm, a recess 16 having a width H of 7 mm, and a curved portion 14A having a curvature R of 3 mm or 5 mm.

A pipe body 12 having an inner diameter of 16 mm, a recess 16 having a width H of 9 mm, and a curved portion 14A having a curvature R of 3 mm, 5 mm, or 7 mm.

A pipe body 12 having an inner diameter of 16 mm, a recess 16 having a width H of 11 mm, and a curved portion 14A having a curvature R of 3 mm, 5 mm, or 7 mm.

A pipe body 12 having an inner diameter of 16 mm, a recess 16 having a width H of 13 mm, and a curved portion 14A having a curvature R of 3 mm or 5 mm.

A pipe body 12 having an inner diameter of 16 mm, a recess 16 having a width H of 15 mm, and a curved portion 14A having a curvature R of 3 mm.

A pipe body 12 having an inner diameter of 23 mm, a recess 16 having a width H of 8 mm, and a curved portion 14A having a curvature R of 7 mm.

A pipe body 12 having an inner diameter of 23 mm, a recess 16 having a width H of 10 mm, and a curved portion 14A having a curvature R of 7 mm.

A pipe body 12 having an inner diameter of 23 mm, a recess 16 having a width H of 12 mm, and a curved portion 14A having a curvature R of 7 mm.

A pipe body 12 having an inner diameter of 23 mm, a recess 16 having a width H of 14 mm, and a curved portion 14A having a curvature R of 7 mm.

A pipe body 12 having an inner diameter of 23 mm, a recess 16 having a width H of 16 mm, and a curved portion 14A having a curvature R of 7 mm or 10 mm.

A pipe body 12 having an inner diameter of 23 mm, a recess 16 having a width H of 18 mm, and a curved portion 14A having a curvature R of 7 mm.

A pipe body 12 having an inner diameter of 23 mm, a recess 16 having a width H of 20 mm, and a curved portion 14A having a curvature R of 7 mm.

(2) The following specifications were used for the comparative example.

A pipe body 102 having an inner diameter of 6 mm, and a curved portion 104A having a curvature R of 0 mm (a sharp corner).

A pipe body 102 having an inner diameter of 16 mm, and a curved portion 104A having a curvature R of 0 mm (a sharp corner).

A pipe body 102 having an inner diameter of 23 mm, and a curved portion 104A having a curvature R of 0 mm (a sharp corner).

3. Evaluation Items (1) The inflow pressure when fluid flows into a pipe body 12 (in (Pa)), and the outflow pressure when fluid flows out from the pipe body 12 (out (Pa)), were derived.

(2) The difference between the inflow pressure and the outflow pressure was derived as the pressure drop (pressure drop (kPa)).

(3) The proportional reduction of pressure drop (pressure drop (%)) in the pipe body 12 according to the present exemplary embodiment, with respect to the pressure drop in a pipe body 102 according to the comparative example of the same internal diameter, was derived.

4. Evaluation Results (1) Evaluation results of the present first exemplary embodiment for a pipe body 12 configured with an inner diameter of 6 mm are listed in the table in FIG. 10A. Evaluation results of the comparative example for a pipe body 102 configured with an inner diameter of 6 mm are listed in the table in FIG. 10B.

(2) Evaluation results of the present first exemplary embodiment for a pipe body 12 configured with an inner diameter of 16 mm are listed in the table in FIG. 11A. Evaluation results of the comparative example for a pipe body 102 configured with an inner diameter of 16 mm are listed in the table in FIG. 11B.

(3) Evaluation results of the present first exemplary embodiment for a pipe body 12 configured with an inner diameter of 23 mm are listed in the table in FIG. 12A. Evaluation results of the comparative example for a pipe body 102 configured with an inner diameter of 23 mm are listed in the table in FIG. 12B.

Summary

As is apparent from the evaluation results above, the proportional reductions in pressure drop in the pipe body 12 are all positive numerical values. Namely, due to forming the recess 16 configured with a curvature R and a width H as described in the evaluation specifications above in the pipe body 12, an increase in pressure drop in fluid flowing through the bend 14 can be suppressed compared to in the pipe body 102 according to the comparative example.

Second Exemplary Embodiment

Next, explanation follows regarding an example of a bent pipe structure according to a second exemplary embodiment of the present invention, with reference to FIG. 16A to FIG. 21B. Note that members that are similar to those of the first exemplary embodiment are appended with the same reference numerals, explanation thereof is omitted, and explanation is mainly given regarding portions that differ from those of the first exemplary embodiment.

Bent Pipe Structure

Figure 16A:
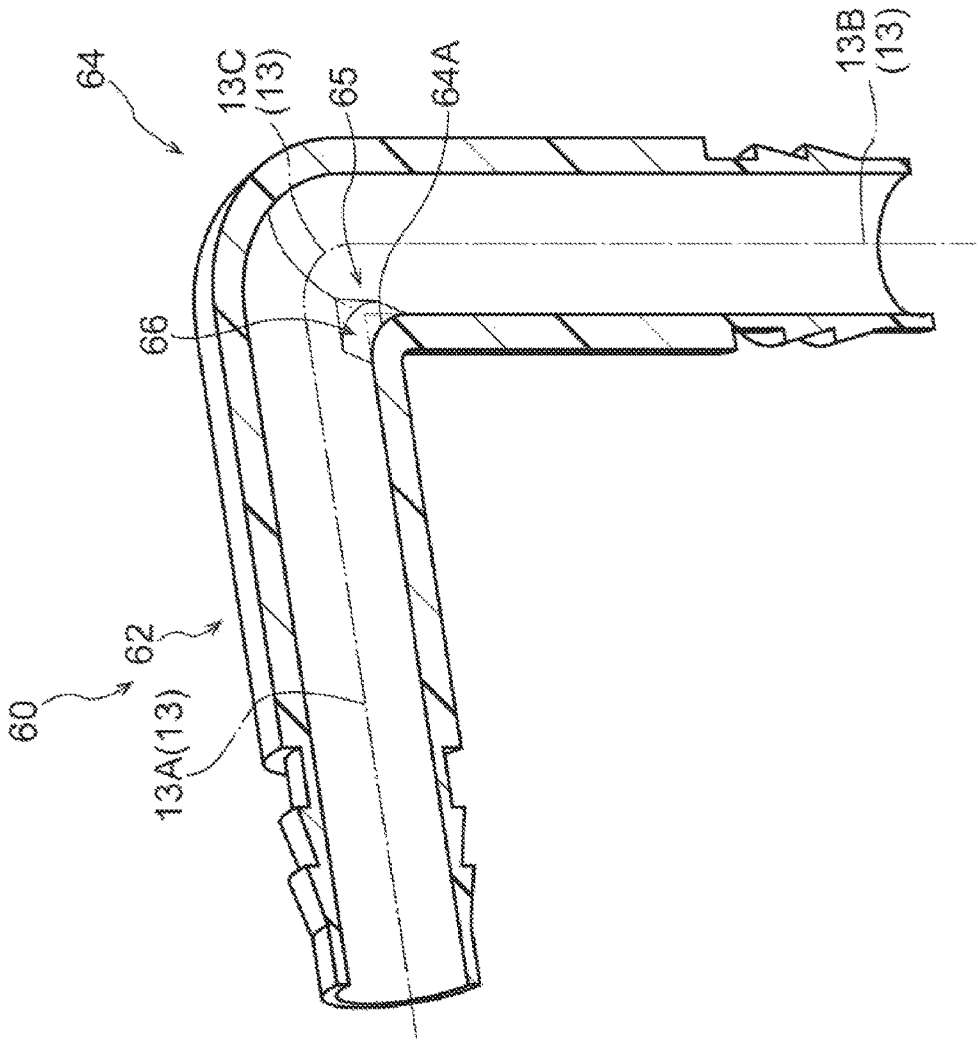
FIG. 16A is a perspective cross-section view illustrating a pipe body provided with a bent pipe structure according to a second exemplary embodiment of the present invention.
Figure 16B:
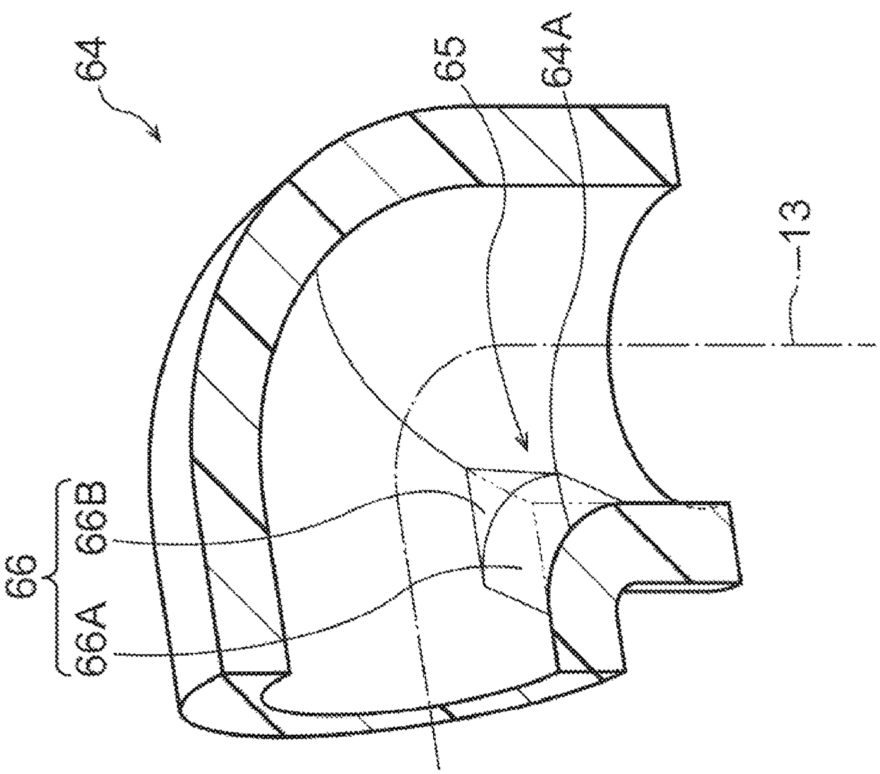
FIG. 16B is an enlarged perspective cross-section view illustrating a pipe body provided with a bent pipe structure according to the second exemplary embodiment of the present invention.
Figure 17:
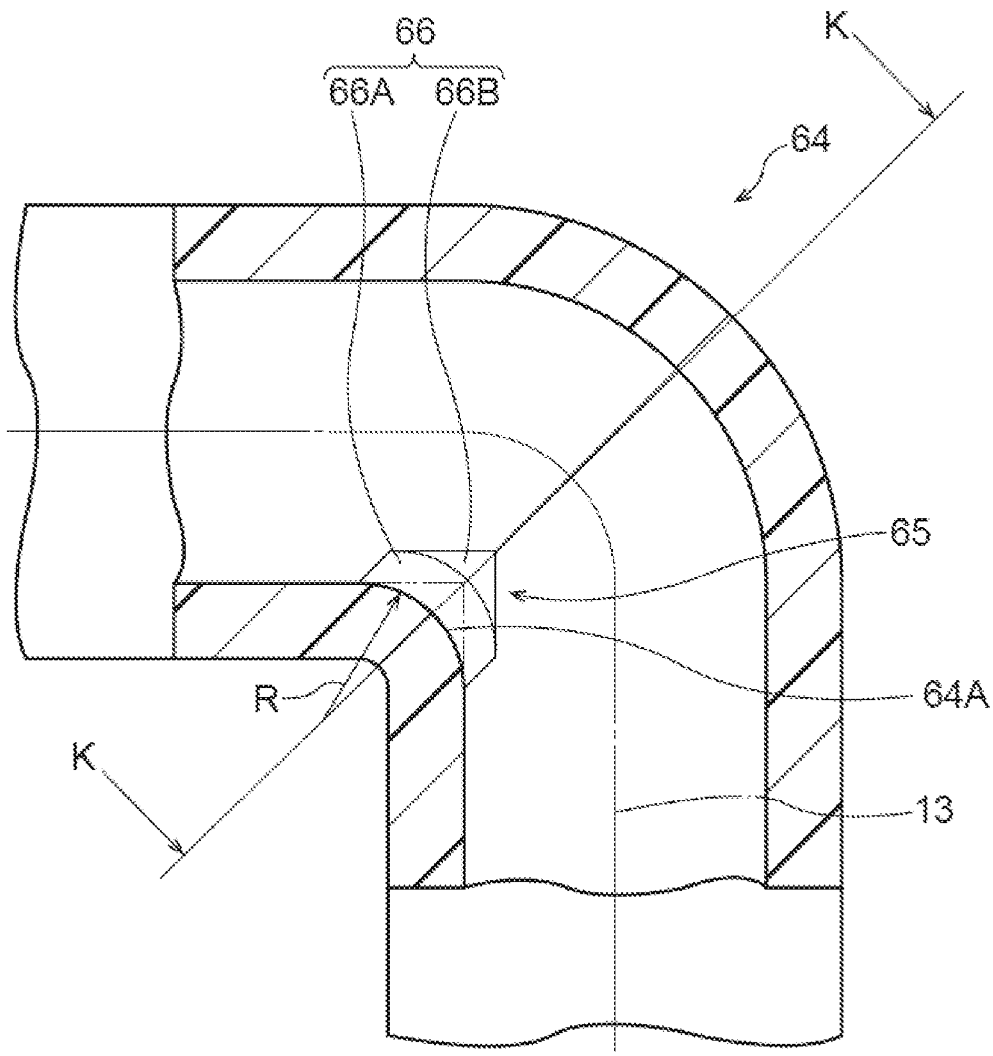
FIG. 17 is a side cross-section illustrating a pipe body provided with a bent pipe structure according to a second exemplary embodiment of the present invention.

As illustrated in FIG. 16A, FIG. 16B, and FIG. 17, a curved portion 64A at an inner circumferential face 65 at a bend direction inside of a bend 64 in a pipe body 62 of a bent pipe 60 according to the second exemplary embodiment is configured with a circular arc shape. By configuring the curved portion 64A with a circular arc shape, a recess 66, serving as an example of a cross-sectional area enlargement portion that enlarges the cross-sectional area of the flow path of a pipe body 62 running along the direction of the axial line 13, is formed in the inner circumferential face 65 on the bend direction inside of the bend 64. The recess 66 is configured from a pair of side face portions 66B that face each other along the axis orthogonal direction (the direction into the page in FIG. 17), and a bottom face portion 66A that couples respective lower ends of the side face portions 66B together (see FIG. 18). The side face portions 66B have flat face shapes, and the bottom face portion 66A has a curved face shape. The radius R illustrated in FIG. 17 denotes a curvature R of the curved portion 64A.

Figure 18:
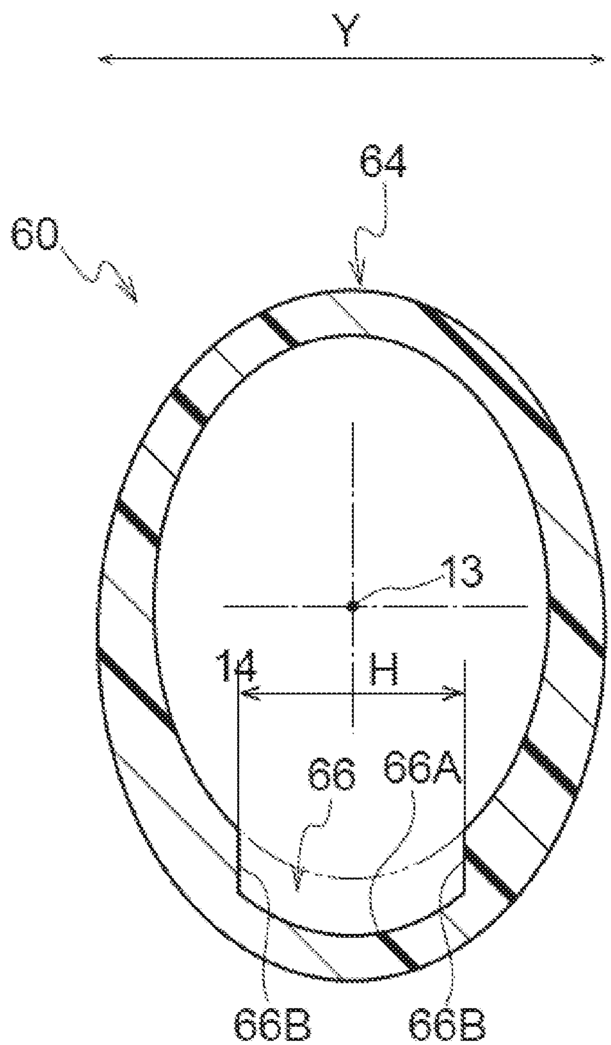
FIG. 18 is a cross-section illustrating a bend of a pipe body provided with a bent pipe structure according to a second exemplary embodiment of the present invention.

A cross-section of the bend 64, sectioned as viewed along the axis orthogonal direction (a cross-section taken along line K-K in FIG. 17), has a shape as illustrated in FIG. 18. By forming the recess 66, the flow path is enlarged with respect to an elliptical shape centered about the axial line 13.

Specifically, the recess 66 is configured from the pair of side face portions 66B and the bottom face portion 66A described above. In the cross-section illustrated in FIG. 18, the side face portions 66B are formed in straight lines, and the bottom face portion 66A is formed in a curved line shape that protrudes toward the outer circumferential side of the pipe body 62. In other words, when viewing the flow path of the bend 64 along the direction of the axial line 13, the side face portions 66B are formed in straight lines, and the bottom face portion 66A is formed in a curved shape that protrudes toward the outer circumferential side of the pipe body 62. The dimension H illustrated in FIG. 18 denotes the width of the recess 66 (width H).

Evaluation

Next, explanation follows regarding evaluation specifications and evaluation results that were evaluated by analyzing the pipe body 62 according to the second exemplary embodiment and the pipe body 102 according to the comparative example.

1. Evaluation Specifications (1) The following specifications were used for the present exemplary embodiment.

A pipe body 62 having an inner diameter of 6 mm, a recess 66 having a width H of 1 mm, and a bend portion 64A having a curvature R of 2 mm or 3 mm.

A pipe body 62 having an inner diameter of 6 mm, a recess 66 having a width H of 2 mm, and a bend portion 64A having a curvature R of 2 mm.

A pipe body 62 having an inner diameter of 16 mm, a recess 66 having a width H of 5 mm, and a bend portion 64A having a curvature R of 7 mm, 9 mm, or 11 mm.

A pipe body 62 having an inner diameter of 16 mm, a recess 66 having a width H of 7 mm, and a bend portion 64A having a curvature R of 7 mm or 9 mm.

A pipe body 62 having an inner diameter of 23 mm, a recess 66 having a width H of 6 mm, and a bend portion 64A having a curvature R of 7 mm, 10 mm, 13 mm, or 16 mm.

A pipe body 62 having an inner diameter of 23 mm, a recess 66 having a width H of 8 mm, and a bend portion 64A having a curvature R of 10 mm or 13 mm.

A pipe body 62 having an inner diameter of 23 mm, a recess 66 having a width H of 10 mm, and a bend portion 64A having a curvature R of 10 mm or 13 mm.

A pipe body 62 having an inner diameter of 23 mm, a recess 66 having a width H of 12 mm, and a bend portion 64A having a curvature R of 10 mm or 13 mm.

A pipe body 62 having an inner diameter of 23 mm, a recess 66 having a width H of 14 mm, and a bend portion 64A having a curvature R of 10 mm.

(2) The following specifications were used for the comparative example (these being similar to those of the first exemplary embodiment)

A pipe body 102 having an inner diameter of 6 mm, and a curved portion 104A having a curvature R of 0 mm (a sharp corner).

A pipe body 102 having an inner diameter of 16 mm, and a curved portion 104A having a curvature R of 0 mm (a sharp corner).

A pipe body 102 having an inner diameter of 23 mm, and a curved portion 104A having a curvature R of 0 mm (a sharp corner).

2. Evaluation Results (1) Evaluation results of the present second exemplary embodiment for a pipe body 62 configured with an inner diameter of 6 mm are listed in the table in FIG. 19A. Evaluation results of the comparative example for a pipe body 102 configured with an inner diameter of 6 mm are listed in the table in FIG. 19B.

(2) Evaluation results of the present second exemplary embodiment for a pipe body 62 configured with an inner diameter of 16 mm are listed in the table in FIG. 20A. Evaluation results of the comparative example for a pipe body 102 configured with an inner diameter of 16 mm are listed in the table in FIG. 20B.

(3) Evaluation results of the present second exemplary embodiment for a pipe body 62 configured with an inner diameter of 23 mm are listed in the table in FIG. 21A. Evaluation results of the comparative example for a pipe body 102 configured with an inner diameter of 23 mm are listed in the table in FIG. 21B.

Summary

As is apparent from the above evaluation results, the proportional reductions in pressure drop in the pipe body 62 are all positive numerical values. Namely, due to forming the pipe body 62 with the recess 66 configured with a curvature R and a width H as described in the evaluation specifications, an increase in pressure drop in fluid flowing through the bend 64 can be suppressed compared to in the pipe body 102 according to the comparative example.

Note that although detailed explanation has been given regarding specific exemplary embodiments of the present invention, the present invention is not limited to these exemplary embodiments, and it would be obvious to a person having ordinary skill in the art that various other exemplary embodiments are possible within the scope of the present invention. For example, the mold configuration explained in the above exemplary embodiments is merely exemplary, and the pipe body may be molded using nested molds or the like.

The invention claimed is:

1. A bent pipe structure comprising:

a pipe body that includes a bend; and a cross-sectional area enlargement portion that is formed by configuring a curved portion with a circular arc shape at an inner circumferential face on a bend direction inside of the bend so as to enlarge a cross-sectional area of a flow path of the pipe body; wherein:

the cross-sectional area enlargement portion includes a pair of side face portions that face each other along an orthogonal direction orthogonal to an axial line of the pipe body, and a bottom face portion that couples lower ends of the side face portions together, and, when viewed along the direction of the axial line, the cross-sectional area enlargement portion is formed in a curved shape that protrudes toward an outer circumferential side of the pipe body; and the bent pipe structure satisfies the following relationships, wherein P (mm) denotes an inner diameter of the pipe body, H (mm) denotes a separation distance between the pair of side face portions, as viewed along the direction of the axial line, and R (mm) denotes a radius of the curved portion:

R=1 when P=6 and H=1,
R=1 when P=6 and H=2,
R=1 or greater and R=2 or less when P=6 and H=3,
R=1 when P=6 and H=4,
R=3 or greater and R=5 or less when P=16 and H=5,
R=3 or greater and R=5 or less when P=16 and H=7,
R=3 or greater and R=7 or less when P=16 and H=9,
R=3 or greater and R=7 or less when P=16 and H=11,
R=3 or greater and R=5 or less when P=16 and H=13,
R=3 when P=16 and H=15,
R=7 when P=23 and H=8,
R=7 when P=23 and H=10,
R=7 when P=23 and H=12,
R=7 when P=23 and H=14,
R=7 or greater and R=10 or less when P=23 and H=16,
R=7 when P=23 and H=18, and
R=7 when P=23 and H=20.

2. The bent pipe structure of claim 1, wherein both end portions of the pipe body are open and configured to couple to a hose.

3. The bent pipe structure of claim 1, wherein a recess is formed in the inner circumferential face on the bend direction inside of the bend.

4. The bent pipe structure of claim 3, wherein an increase in pressure drop of fluid is suppressed at the recess.

5. The bent pipe structure of claim 3, wherein the recess is configured from the pair of the side face portions that face each other along the orthogonal direction and the bottom face portion that couples respective lower ends of the pair of the side face portions.

6. The bent pipe structure of claim 1, wherein the pipe body is formed by a mold.

7. The bent pipe structure of claim 6, wherein the mold comprises an outer mold and an inner mold.

8. The bent pipe structure of claim 7, wherein the outer mold comprises a two-piece split mold structure that forms an outer circumferential face of the pipe body.

9. The bent pipe structure of claim 7, wherein the outer mold is made of synthetic resin and molded by injection molding.

10. The bent pipe structure of claim 7, wherein the inner mold comprises:

a pair of primary cores having a shape substantially similar to each other; and a pair of hinged cores having a shape substantially similar to each other acting as secondary cores; and wherein each of the primary cores and each of the pair of hinged cores has an elongated shape running along the direction of the axial line of the pipe body.

11. A bent pipe structure, comprising:

a pipe body that includes a bend; and a cross-sectional area enlargement portion that is formed by configuring a curved portion with a circular arc shape at an inner circumferential face on a bend direction inside of the bend so as to enlarge a cross-sectional area of a flow path of the pipe body; wherein:

the cross-sectional area enlargement portion includes a pair of side face portions that face each other along an orthogonal direction orthogonal to an axial line of the pipe body, and a bottom face portion that couples lower ends of the side face portions together, and, when viewed along the direction of the axial line, the side face portions are formed with straight lines and the bottom face portion is formed in a curved shape that protrudes toward an outer circumferential side of the pipe body; and the bent pipe structure satisfies the following relationships, wherein P (mm) denotes an inner diameter of the pipe body, H (mm) denotes a separation distance between the pair of side face portions, as viewed along the direction of the axial line, and R (mm) denotes a radius of the curved portion:

R=2 or greater and R=3 or less when P=6 and H=1,

R=2 when P=6 and H=2,

R=7 or greater and R=11 or less when P=16 and H=5,

R=7 or greater and R=9 or less when P=16 and H=7,

R=7 or greater and R=16 or less when P=23 and H=6,

R=10 or greater and R=13 or less when P=23 and H=8,

R=10 or greater and R=13 or less when P=23 and H=10,

R=10 or greater and R=13 or less when P=23 and H=12, and

R=10 when P=23 and H=14.

12. The bent pipe structure of claim 11, wherein both end portions of the pipe body are open and configured to couple to a hose.

13. The bent pipe structure of claim 11, wherein a recess is formed in the inner circumferential face on the bend direction inside of the bend.

14. The bent pipe structure of claim 13, wherein an increase in pressure drop of fluid is suppressed at the recess.

15. The bent pipe structure of claim 13, wherein the recess is configured from the pair of the side face portions that face each other along the orthogonal direction and the bottom face portion that couples respective lower ends of the pair of the side face portions.

16. The bent pipe structure of claim 11, wherein the pipe body is formed by a mold.

17. The bent pipe structure of claim 16, wherein the mold comprises an outer mold and an inner mold.

18. The bent pipe structure of claim 17, wherein the outer mold comprises a two-piece split mold structure that forms an outer circumferential face of the pipe body.

19. The bent pipe structure of claim 17, wherein the outer mold is made of synthetic resin and molded by injection molding.

20. The bent pipe structure of claim 17, wherein the inner mold comprises:

a pair of primary cores having a shape substantially similar to each other; and a pair of hinged cores having a shape substantially similar to each other acting as secondary cores; and wherein each of the primary cores and each of the pair of hinged cores has an elongated shape running along the direction of the axial line of the pipe body.

* * * * *